United States Patent
Vertes et al.

(10) Patent No.: US 9,544,077 B2
(45) Date of Patent: Jan. 10, 2017

(54) METHOD FOR TRANSMITTING USEFUL INFORMATION BETWEEN TWO TERMINALS AND METHOD FOR GENERATING AN ASSOCIATION TABLE USED IN THE CONTEXT OF THE TRANSMISSION

(71) Applicant: SIGFOX, Labege (FR)

(72) Inventors: Marc Vertes, Saint-Lys (FR); Cedric Artigue, Toulouse (FR); Nicolas Chalbos, Eaunes (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 14/431,700

(22) PCT Filed: Oct. 1, 2013

(86) PCT No.: PCT/FR2013/052341
§ 371 (c)(1),
(2) Date: Mar. 26, 2015

(87) PCT Pub. No.: WO2014/053769
PCT Pub. Date: Apr. 10, 2014

(65) Prior Publication Data
US 2015/0244483 A1    Aug. 27, 2015

(30) Foreign Application Priority Data
Oct. 1, 2012 (FR) .................... 12 59283

(51) Int. Cl.
*H04J 3/06* (2006.01)
*H04L 7/04* (2006.01)

(52) U.S. Cl.
CPC ............ *H04J 3/0605* (2013.01); *H04J 3/0608* (2013.01); *H04L 7/041* (2013.01); *H04L 7/042* (2013.01)

(58) Field of Classification Search
CPC ....... H04J 3/0605; H04J 3/0608; H04L 7/042; H04L 7/041
See application file for complete search history.

(56) References Cited

U.S. PATENT DOCUMENTS

| | | | |
|---|---|---|---|
| 4,876,740 A | 10/1989 | Levine et al. | |
| 2001/0005406 A1 | 6/2001 | Mege et al. | |
| 2009/0196278 A1* | 8/2009 | Song ................... | H04B 1/7075 370/350 |
| 2011/0103506 A1* | 5/2011 | Moon .................. | H04L 5/0023 375/267 |

FOREIGN PATENT DOCUMENTS

EP        1 107 492 A1    6/2001

* cited by examiner

*Primary Examiner* — Clemence Han
(74) *Attorney, Agent, or Firm* — Im IP Law; C. Andrew Im

(57) ABSTRACT

A method for transmitting useful information between a transmitting terminal and a receiving terminal connected via a transmission channel. The transmitting terminal defines control information for the useful information, and searches in an association table, which is accessible from the transmitting terminal, for a frame-synchronization word associated with the control information. The transmitting terminal generates a frame of data from the useful information, and transmits, over the transmission channel, a data stream that includes the frame-synchronization word and the frame of data.

5 Claims, 3 Drawing Sheets

METHOD FOR TRANSMITTING USEFUL INFORMATION BETWEEN TWO TERMINALS AND METHOD FOR GENERATING AN ASSOCIATION TABLE USED IN THE CONTEXT OF THE TRANSMISSION

RELATED APPLICATIONS

This application is a §371 application from PCT/FR2013/052341 filed Oct. 1, 2013, which claims priority from French Patent Application No. 12 59283 filed Oct. 1, 2012, each of which is herein incorporated by reference in its entirety.

TECHNICAL FIELD OF THE INVENTION

The invention relates to a method for transmitting useful information between a transmitting terminal and a receiving terminal linked by a transmission channel. The invention also relates to a method for generating an association table used in the context of the transmission.

The invention is particularly advantageously applicable for transmitting short useful information (less than 1 kilobytes) and/or for transmitting useful information with a low bit rate (for example with a bit transmission frequency of less than 1 KHz). The invention could however be applied to higher bit rate links and to longer useful information.

The typical useful information size corresponds to messages of datagram type, in unconnected mode, of from a few bytes to a maximum size of less than 1 kilobytes (8 Kbits). The messages are typically transmitted at low bit rate (<1 kbit/s) and low frequency: a few messages per hour. The invention relates more particularly to discontinuous transmissions.

BACKGROUND OF THE INVENTION

A useful information item can generally be transmitted between a transmitting terminal and a receiving terminal in a plurality of transmission formats. For example, a useful information item can be transmitted by using a number of possible modulations (BPSK, DBPSK, OPSK, 16QAM, etc.) and/or a number of possible types of error correcting codes and/or a number of possible redundancy levels, etc. Furthermore, it is also possible to allow the transmission of useful information items of different sizes.

In order to facilitate the reception of a useful information item by the receiving terminal, it is known practice to transmit, between the transmitting terminal and the receiving terminal, control information items relating to the transmission format used by the transmitting terminal (size of the useful information item, modulation, error correcting code, redundancy/punching rate, etc.).

It is understood that, if the control information items are not correctly interpreted by the receiving terminal, the transmission format used by said receiving terminal to interpret the useful information item will be different from the transmission format actually used by the transmitting terminal, such that the useful information item will not be correctly interpreted by said receiving terminal. To remedy this problem, the control information items are generally made reliable, for example by using a modulation with predefined low spectral efficiency and/or by using an error correcting code with a predefined high redundancy level, etc.

Furthermore, in a multiple access network, in which multiple and independent transmitting terminals have the initiative for the moment of transmission, means have to be implemented to make it possible to accurately detect, in a data stream, the start of the useful information item. As is known, the preamble contains a synchronization word, called "frame synchronization" word, identifiable by all the receiving terminals. For example, each receiving terminal which receives the data stream performs a sliding correlation of the frame synchronization word over the data stream. When the maximum result of the correlation exceeds a predefined threshold, it is considered that the frame synchronization word is present in the data stream, at the position that made it possible to obtain said maximum result. The detection of the position of the frame synchronization word enables the receiving terminal to know the start of the useful information item in the data stream.

In the transmission of a useful information item between a transmitting terminal and a receiving terminal, the useful information item can thus be preceded by a preamble containing both a frame synchronization word and control information items. The size of the preamble can be considerable compared to the size of the useful information item, especially for short useful information items and/or when the control information items have a high redundancy level for reliability purposes. Now, the effectiveness of the use of a frequency band decreases as the ratio between the size of the preamble and the size of the useful information item increases. This is all the more detrimental if the frequency band used for the transmissions is narrow, for example of the order from a few hertz to a few hundreds of hertz.

OBJECT AND SUMMARY OF THE INVENTION

The invention proposes limiting the size of the preamble in a transmission by introducing a plurality of frame synchronization words which, while being adapted to allow an effective detection of the useful information item in a data stream, represent distinct respective control information items.

According to a first aspect, the invention relates to a method for transmitting a useful information item between a transmitting terminal and a receiving terminal linked by a transmission channel, characterized in that the transmitting terminal implements the steps of defining a control information item for the useful information, searching in an association table, accessible from the transmitting terminal, for a synchronization word, called frame synchronization word, associated with the control information item, said association table comprising a plurality of frame synchronization words associated with distinct respective control information items, generating a data frame from the useful information item, and sending, over the transmission channel, a data stream comprising the frame synchronization word and the data frame.

The invention makes it possible to limit the size of the preamble by incorporating all the control information items in the frame synchronization word. According to the prior art, there was just one frame synchronization word of length L, concatenated with a control information item of length D, such that the preamble was of length (L+D). According to the invention, a plurality of frame synchronization words of length L are considered, respectively representing different control information items, such that the preamble is of length L, provided that the length L is sufficient to distinguish all the possible control information items. The invention thus makes it possible to reduce the size of the preamble and improve the effectiveness of the use of a frequency band. This improvement is particularly significant if the useful information items are short and/or if the frequency band used is narrow.

Advantageously, the receiving terminal implements the steps of receiving the data stream, searching, in the data stream, for the presence of each frame synchronization word of an association table accessible from the receiving terminal, and, when a frame synchronization word has been detected in the data stream, searching, in the association table, for the control information item associated with the detected frame synchronization word, and extracting the useful information item from the data stream using the control information item.

Advantageously, the step of searching for the presence of each frame synchronization word of the association table comprises the steps of moving a sliding window over the data stream, and, for each position of the sliding window, calculating the correlation between the content of the sliding window and each frame synchronization word of the association table, the detected frame synchronization word corresponding to the frame synchronization word of the association table for which the maximum value of all the correlations and of all the positions of the sliding window has been reached.

Advantageously, when the correlation between the content of the sliding window and a frame synchronization word is above a threshold, said frame synchronization word is saved and the step of searching for the presence of each frame synchronization word of the association table to detect is stopped. This makes it possible to limit the frame synchronization word processing operations.

According to a second aspect, the invention relates to a method for generating an association table between frame synchronization words and control information items, characterized in that it comprises the steps of defining all the possible control information items, defining a set of frame synchronization words according to the number of possible control information items, and associating, with each possible control information item, a frame synchronization word contained in the set of frame synchronization words.

Advantageously, the step of defining a set of frame synchronization words comprises the steps of defining a length of frame synchronization word according to the number of possible control information items such that said length is sufficient to distinguish all the possible control information items, listing a set of permutations of a word of said length so as to obtain a set of raw words, filtering the set of raw words so as to obtain the set of frame synchronization words. The aim of the filtering is to eliminate the raw words which do not satisfy a predefined error resistance criterion.

In other words, the filtering makes it possible to select the frame synchronization words that are weakly correlated together so as to obtain a set of frame synchronization words that observe the predefined acceptable error criteria, such as, for example, the error tolerance.

Advantageously, the step of filtering the set of raw words comprises the steps of calculating, for each raw word, a sliding correlation between the raw word and an association word comprising the raw word concatenated with a reference word, calculating a ratio between an absolute maximum of the correlation and a local maximum of the sliding correlation immediately below said absolute maximum, and deleting from the set of raw words all the raw words for which the ratio is below a predefined threshold.

Advantageously, the step of calculating a sliding correlation between the raw word and an association word comprises the steps of, as long as the number of realization is less than a predefined number of realization, randomly generating a reference word, generating an association word by concatenating said reference word with the raw word, calculating a sliding correlation between the raw word and the association word, and saving the values of the sliding correlation, when the number of realization is reached, calculating an average of the values of the sliding correlation.

Advantageously, the step of filtering the set of raw words comprises the steps of calculating, for each raw word, the number of different bits between this raw word and the other words of the set of raw words, and, when the result is below a threshold, deleting from the set of raw words one of the two raw words compared.

Advantageously, the step of filtering the set of raw words comprises the steps of calculating, for each raw word, a sliding correlation between the raw word and an association word comprising the raw word concatenated with a reference word, calculating a ratio between an absolute maximum of the correlation and a local maximum of the sliding correlation immediately below said absolute maximum, and deleting from the set of raw words all the raw words for which the ratio is below a predefined threshold, calculating, for each remaining raw word, the number of different bits between this raw word and the other words of the set of raw words, and, when the result is below a threshold, deleting from the set of raw words one of the two raw words compared.

Thus, in the particular case in which the preamble of the frame consists of the concatenation of a reference word and of a frame synchronization word as defined above, the method for generating the association table takes into account this reference word. In other words, in this particular case, the frame synchronization words for establishing the association table are generated according to this reference word. In practice, this reference word can, for example, be a so-called bit synchronization word, generally consisting of an alternation of zeros and ones representative of the transmission bit rate. This bit synchronization word notably enables the receiver to find the sampling instants, the carrier, etc.

The generation method described above therefore has the advantage of being able to be adapted to any reference word which will have to precede the frame synchronizations word in the frame to be sent.

The generation method also has the advantage of being able to generate frame synchronization words which are optimized in terms of size relative to the number of possible combinations between the control information items.

Thus, the invention according to this second aspect therefore has the advantage of making it possible to generate and select frame synchronization words as defined above, according to a certain number of predefined acceptable criteria, such as, for example, the acceptable level of tolerance to errors in each of the frame synchronization words, the maximum size of the preamble, to be adapted, for example, to low bit rate transmissions.

In particular, the frame synchronization words generated by the method of the invention make it possible to obtain, notably in the case in which a reference word will have to be contained in the preamble, a preamble of minimum size which encodes a maximum of control information items and which offers a maximum of protection against transmission errors.

BRIEF DESCRIPTION OF THE DRAWINGS

The invention will be better understood on reading the following description, given as a nonlimiting example, and with reference to the figures which represent.

In these figures, identical references from one figure to another denote identical or similar elements. For reasons of clarity, elements represented are not to scale unless stated otherwise.

DETAILED DESCRIPTION OF EMBODIMENTS

Figure 1:
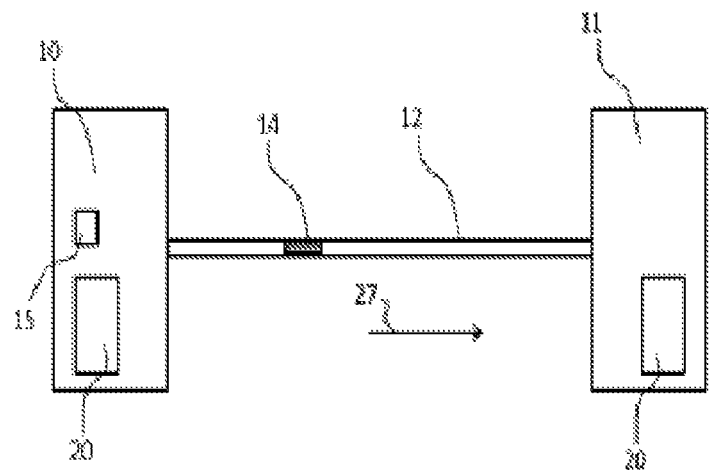
FIG. 1: a schematic representation of a transmission of a useful information item between two terminals.

FIG. 1 shows a communication between a transmitting terminal 10 and a receiving terminal 11 over a transmission channel 12. The transmission channel 12 can be of any known type, radio frequency, wired, optical, etc. The transmission channel 12 makes it possible to transmit a useful information item 15 in the form of a data stream 14 in the direction 27. As a variant, the transmission channel 12 can also allow the communication in both transmission directions.

Figure 2:
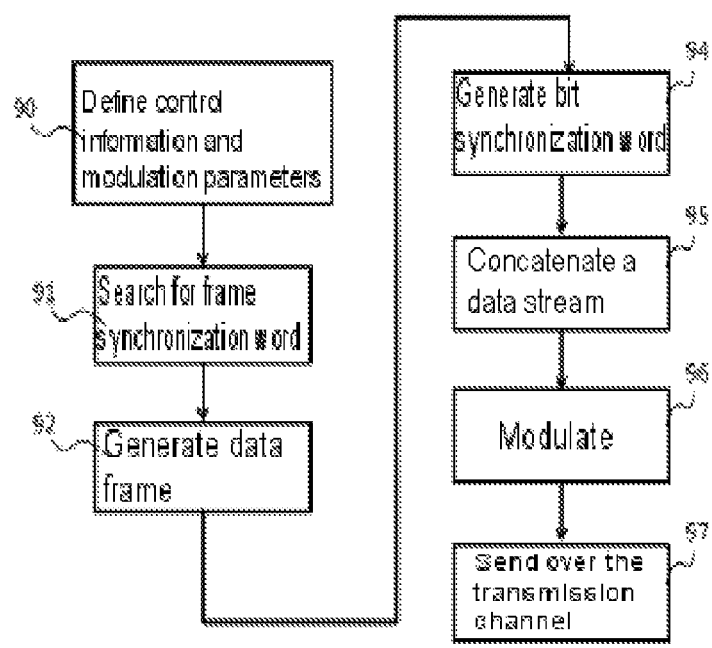
FIG. 2: a flow diagram of the steps of transmission of a useful information item according to one embodiment of the invention.
Figure 3:
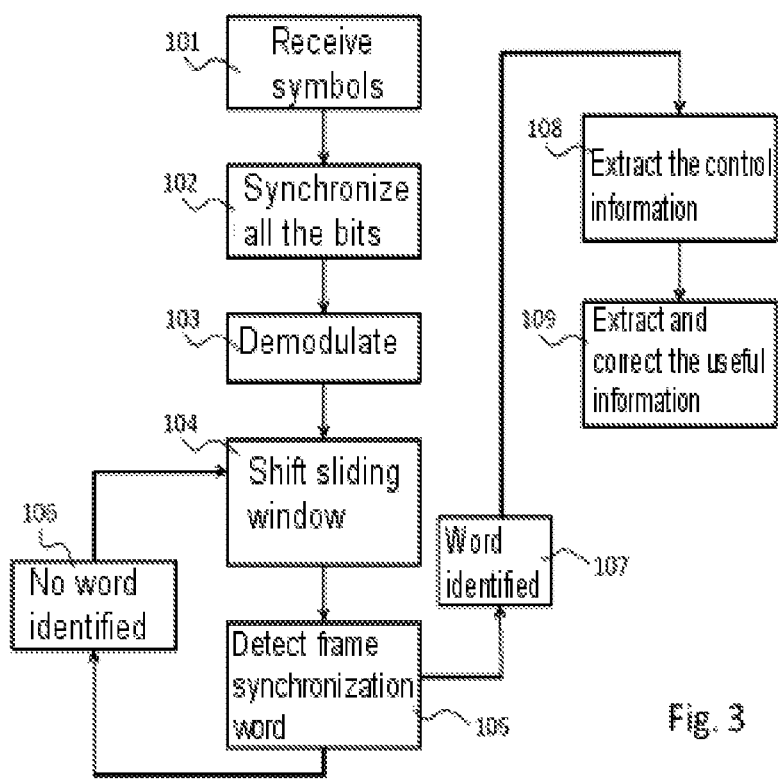
FIG. 3: a flow diagram of the steps of reception of a useful information item according to one embodiment of the invention.
Figure 4:
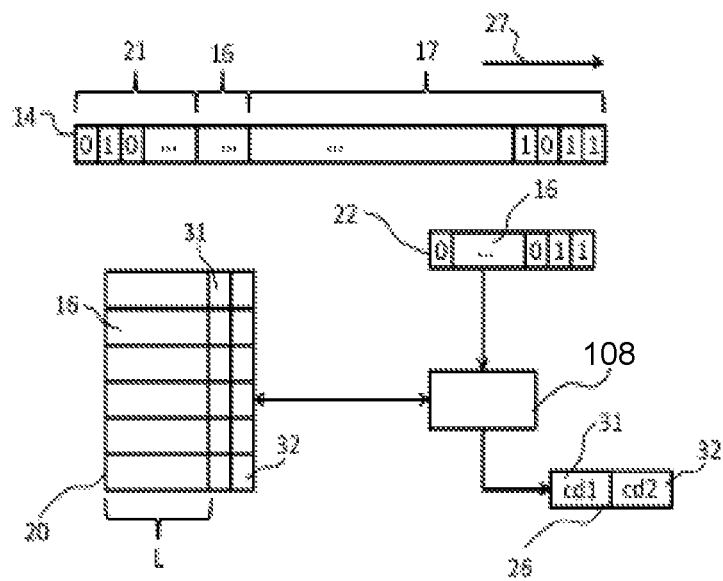
FIG. 4: a schematic representation of a method for extracting the control information items according to one embodiment of the invention.

The transmitting terminal 10 and the receiving terminal 11 have access to an association table 20 containing frame synchronization words 16 respectively associated with distinct control information items 26. FIGS. 2-4 detail the steps of transmission of the useful information item 15.

At first, the useful information item 15 is contained on the transmitting terminal 10. Depending on the transmission format (see above) desired for the transmission of the useful information item, a control information item 26 is defined (step 90). The control information item 26 can be: the size 31 of the useful information item 15, the retransmission index, the scrambling mode, the flag of encryption of the useful information item 15, the protocol version, in short, all pre-requisite essential information for the extraction of the data, according to the protocol considered.

The control information item 26 comprises one or more parameters and there are as many control information items 26 as there are possible combinations of parameters.

The control information items 26 are pre-established in an association table 20 in which each possibility of the control information items 26 corresponds to a frame synchronization word 16. As a variant, some of the parameters of the transmission format used can be transmitted conventionally in the form of a control information item transmitted between the frame synchronization word 16 and the useful information item 15 (for example, if this portion of parameters represents an excessive number of combinations, that is to say a number of frame synchronization words that is too great to search for on the receiving terminal). Upon the transmission of a useful information item 15, the frame synchronization word 16 is extracted (step 91) from the association table 20 according to the control information items 26.

In order to send the useful information item 15 over the transmission channel 12, the useful information item 15 is, for example, converted (step 92) into the form of a data frame 17. When the transmission includes a modulation, a frequency synchronization word, called bit synchronization word 21, can also be generated (step 94). The bit synchronization word 21 and the frame synchronization word 16 then constitute the preamble of the data frame 17.

The preamble is concatenated (step 95) with the data frame 17 thus forming a data stream 14. The data stream 14 is modulated (step 96) before being sent (step 97) over the transmission channel 12.

For a transmission of a modulated data stream 14, the receiving terminal 11 receives (step 101) a set of symbols. The search for and the analysis of (step 102) the bit synchronization word 21 makes it possible to perform the demodulation (step 103) of all the symbols received. To define the position of the useful information item 15, the frame synchronization word 16 is searched for (step 104) by a sliding window 22 being moved over the data stream 14.

For each position of the sliding window 22, the receiving terminal 11 calculates the correlation of the content of the sliding window 22 with all the frame synchronization words 16 of the association table 20. The highest result of the correlation is saved as well as the corresponding frame synchronization word 16. If the result is above or equal to a threshold, for example 1, the frame synchronization word 16 is identified (step 107) and the control information items 26 are extracted (step 108) from the association table 20. Using the control information items 26, the receiving terminal 11 can thus extract and correct (step 109) the information 15. Otherwise, if no frame synchronization word 16 is clearly identified (step 106), the sliding window 22 is shifted over the data stream 14. At the end of all the shifts of the sliding window 22, the frame synchronization word 16 is identified by the maximum correlation result. On the other hand, if this result is below a threshold, the frame synchronization word 16 is not saved and the transmission is considered to be errored. The receiving terminal 11 can then ask the transmitting terminal 10 to resend the data stream 14.

FIG. 4 shows the structure of the data stream 14 which is sent over the transmission channel 12. The data stream 14 comprise the bit synchronization word 21 followed by the frame synchronization word 16 as well as the data frame 17. FIG. 4 also shows, schematically, the process of decoding of the useful information item 15 described in the form of a flow diagram in FIG. 3.

Figure 5:
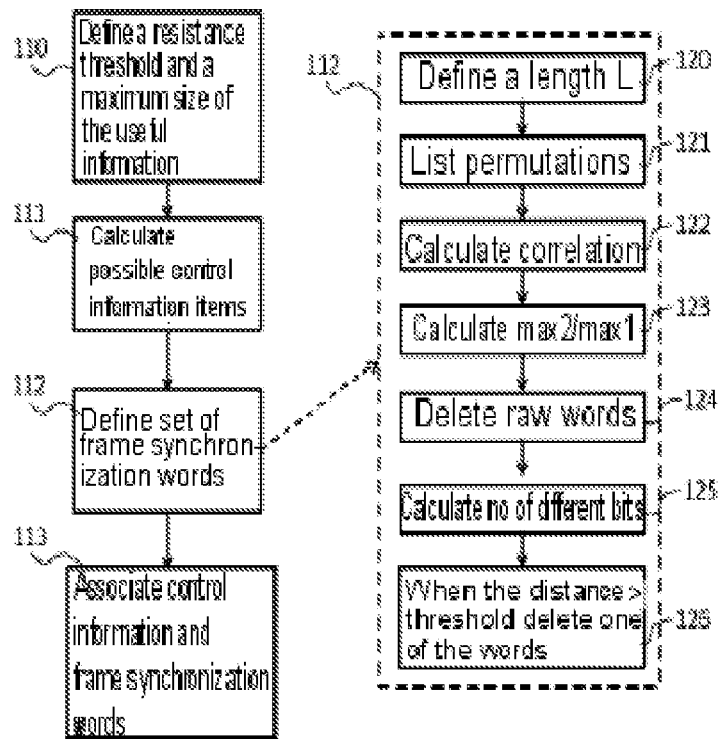
FIG. 5: a flow diagram of generation of an association table according to one embodiment of the invention.
Figure 6:
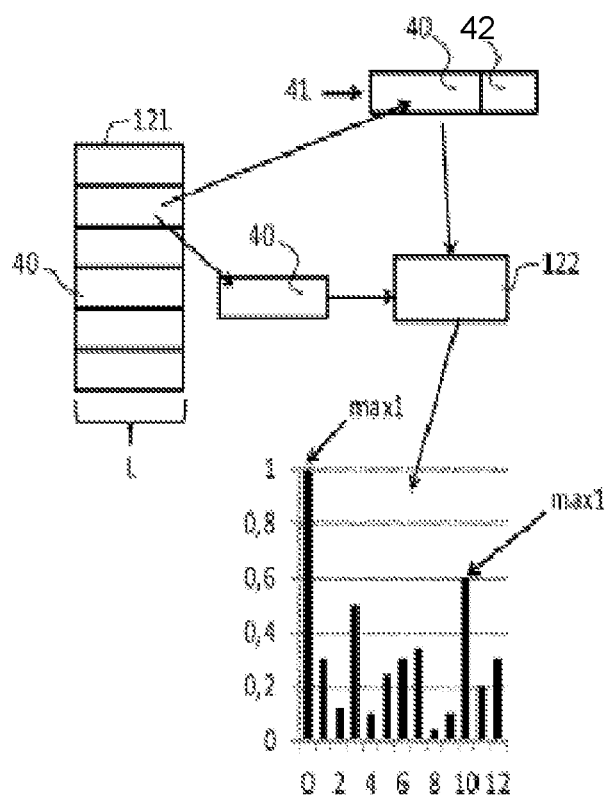
FIG. 6: a schematic representation of the method for filtering the raw words to construct the set of frame synchronization words according to one embodiment of the invention.

The invention also relates to the generation of an association table 20 described with FIGS. 5 and 6. In the example of FIG. 5, the association table 20 is generated according to a plurality of predefined parameters (step 110) such as a maximum size of the useful information item 15 which can be transmitted. All the possible control information items 26 are listed (step 111) and, based on the number of possible control information items 26, a set of frame synchronization words 16 is defined. Each possible control information item 26 is associated (step 113) in the association table 20 with a frame synchronization word 16.

To define this set of frame synchronization words 16, a length L of the frame synchronization words 16 is calculated (step 120) according to the number of possible control information items 26. A set of permutations is then searched (step 121) for this length L forming a set of raw words 40.

As a variant, all the permutations are searched. For each raw word 40, a sliding correlation is calculated (step 122) between the raw word 40 and an association word 41 comprising the raw word 40 concatenated with a reference word 42. The expression "sliding correlation" should be understood to mean the calculation of the correlation between the content of a sliding window, being moved over the association word 41, and the raw word 40. This sliding correlation makes it possible to obtain a correlation value for each position of the sliding window.

Preferably, the reference word 42 corresponds to the bit synchronization word 21 used in the preamble of the data stream 14. As a variant, the calculation of the sliding correlation is performed over a plurality of realizations with a plurality of reference words 42 generated randomly so as to provide an average correlation.

FIG. 6 shows that the result of the sliding correlation exhibits a first maximum, called absolute maximum max1, equal to 1 when the raw word 40 is compared with itself. A second maximum, called local maximum max2, appears when a large number of bits are similar between the raw word 40 and the association word 41. The ratio between the absolute maximum max1 and the local maximum max2 immediately below the absolute maximum max1 is calculated (step 123) and gives an account of the number of bits which can be errored in the transmission without compromising the detection of a frame synchronization word 16. Thus, all the raw words 40 for which the ratio is below a predefined threshold are deleted (step 124).

The remaining raw words 40 are filtered to eliminate the raw words 40 that are too close, that is to say those for which the number of different bits is below a threshold. For example, the proximity of the raw words 40 is measured (step 125) by the Hamming distance and when the distance is below the threshold, one of the two raw words 40 is deleted (step 126). The frame synchronization words 16 are selected from the raw words 40 to produce the association table 20. The frame synchronization words 16 are therefore selected to limit their transmission errors.

The invention thus makes it possible to limit the number of data which are sent to accompany and secure the transmission of the useful information item 15. Although the invention requires all the terminals to have access to an equivalent association table 20, the invention is particularly effective for the transmissions of short useful information items and for transmissions at low bit rate. Furthermore, the means for generating and selecting the frame synchronization words 16 makes it possible to secure the transmission of the control information items 26.

The invention claimed is:

1. A method for generating an association table between frame synchronization words and control information items, comprising the steps of:
    defining all possible control information items;
    defining a set of frame synchronization words according to a number of possible control information items by:
        defining a length L of the frame synchronization word according to the number of possible control information items such that the length L is sufficient to distinguish all the possible control information items;
        listing a set of permutations of a word of the length L to obtain a set of raw words; and
        filtering the set of raw words to obtain the set of frame synchronization words; and
    associating, with each possible control information item, a frame synchronization word in the set of frame synchronization words.

2. The method as claimed in claim 1, wherein the step of filtering the set of raw words comprises the steps of:
    calculating, for each raw word, a sliding correlation between said each raw word and an association word comprising said each raw word concatenated with a reference word;
    calculating a ratio between an absolute maximum of the sliding correlation and a local maximum of the sliding correlation immediately below the absolute maximum; and
    deleting from the set of raw words all raw words for which the ratio is below a predefined threshold.

3. The method as claimed in claim 2, further comprising the step of calculating a sliding correlation for a number of realization less than a predefined number of realization by:
    randomly generating the reference word;
    generating the association word by concatenating said reference word with said each raw word;
    calculating the sliding correlation between said each raw word and the association word;
    saving values of the sliding correlation in response to determining the number of realization equals the predefined number of realization; and
    calculating an average of the values of the sliding correlation.

4. The method as claimed in claim 1, wherein the step of filtering the set of raw words comprises the steps of:
    calculating, for each raw word, a number of different bits between said each raw word and other words of the set of raw words; and
    deleting from the set of raw words one of two words compared in response to determining a result of the calculation of the number of different bits is below a threshold.

5. The method as claimed in claim 1, wherein the step of filtering the set of raw words comprises the steps of:
    calculating, for each raw word, a sliding correlation between said each raw word and an association word comprising said each raw word concatenated with a reference word;
    calculating a ratio between an absolute maximum of the sliding correlation and a local maximum of the sliding correlation immediately below the absolute maximum; and
    deleting from the set of raw words all raw words for which the ratio is below a predefined threshold;
    calculating, for each remaining raw word, a number of different bits between said each remaining raw word and other words of the set of raw words; and
    deleting from the set of raw words one of two words compared in response to determining a result of the calculation of the number of different bits is below a threshold.

\* \* \* \* \*